US010848549B1

(12) United States Patent
Rizvi et al.

(10) Patent No.: US 10,848,549 B1
(45) Date of Patent: Nov. 24, 2020

(54) LEADERLESS, PARALLEL, AND TOPOLOGY-AWARE PROTOCOL FOR ACHIEVING CONSENSUS

(71) Applicants: Syed Muhammad Sajjad Rizvi, Kitchener (CA); Bernard Wong, Waterloo (CA); Srinivasan Keshav, Waterloo (CA)

(72) Inventors: Syed Muhammad Sajjad Rizvi, Kitchener (CA); Bernard Wong, Waterloo (CA); Srinivasan Keshav, Waterloo (CA)

( * ) Notice: Subject to any disclaimer, the term of this patent is extended or adjusted under 35 U.S.C. 154(b) by 252 days.

(21) Appl. No.: 16/204,925

(22) Filed: Nov. 29, 2018

Related U.S. Application Data

(60) Provisional application No. 62/592,257, filed on Nov. 29, 2017.

(51) Int. Cl.
  *H04L 29/08* (2006.01)
  *H04L 29/06* (2006.01)
  *G06F 16/27* (2019.01)

(52) U.S. Cl.
  CPC .............. *H04L 67/10* (2013.01); *G06F 16/27* (2019.01); *H04L 67/42* (2013.01); *H04L 67/18* (2013.01)

(58) Field of Classification Search
  CPC ......... H04L 67/10; H04L 67/42; H04L 67/18; G06F 16/27
  See application file for complete search history.

(56) References Cited

U.S. PATENT DOCUMENTS

| | | | |
|---|---|---|---|
| 10,423,609 B1* | 9/2019 | Strauss | G06F 11/2094 |
| 10,489,230 B1* | 11/2019 | Chen | G06F 11/0778 |
| 10,764,030 B2* | 9/2020 | Yanagisawa | H04L 9/0891 |
| 2017/0236120 A1* | 8/2017 | Herlihy | G06F 21/57 |
| | | | 705/67 |
| 2018/0157558 A1* | 6/2018 | Karame | G06F 11/1451 |
| 2018/0322423 A1* | 11/2018 | Sebastian | H04L 47/70 |
| 2019/0097790 A1* | 3/2019 | Li | H04L 9/0819 |
| 2019/0132350 A1* | 5/2019 | Smith | H04L 41/22 |
| 2019/0258646 A1* | 8/2019 | Chen | G06F 16/273 |
| 2019/0314726 A1* | 10/2019 | Masini | A63F 13/71 |
| 2019/0332586 A1* | 10/2019 | Wang | G06Q 20/405 |
| 2020/0067697 A1* | 2/2020 | Puddu | G06F 21/602 |
| 2020/0192770 A1* | 6/2020 | Walid | G06Q 20/401 |

* cited by examiner

*Primary Examiner* — Brian J. Gillis
*Assistant Examiner* — Javier O Guzman
(74) *Attorney, Agent, or Firm* — Patent Law Works LLP

(57) ABSTRACT

Methods are provided for achieving consensus among an order in which write requests are received by various ones of a plurality of nodes in a distributed system using a shared data structure. The plurality of nodes are organized into groups of nodes and successively larger groupings of groups, based on physical proximity. A consensus protocol is used to achieve consensus among groups of nodes, and then among the groupings of groups of nodes in a logical tree structure up to a root level virtual node.

18 Claims, 9 Drawing Sheets

700

Share first-group level proposal with second group of nodes of plurality of nodes, second group of nodes being separate from first group of nodes, each group of nodes being grouped based on physical proximity
702

Receive from second group of nodes, ordered second-group level proposal, second-group level proposal being ordered aggregation of node-level proposals from nodes of second group of nodes, each node-level proposal being ordered aggregation of write requests received by corresponding node of second group and assigned proposal number, ordered group-level proposal achieving a second group level consensus
704

Aggregate ordered first-group level proposal and ordered second-group level proposal into first grouping of group level proposals, first grouping of group level proposals achieving consensus between first group of nodes and second group of nodes
706

Figure 7

LEADERLESS, PARALLEL, AND TOPOLOGY-AWARE PROTOCOL FOR ACHIEVING CONSENSUS

CROSS-REFERENCE TO RELATED APPLICATIONS

The present application claims the benefit under 35 U.S.C. § 119(e) of U.S. Provisional Patent Application Ser. No. 62/592,257, entitled "Leaderless, Parallel, and Topology-Aware Protocol for Achieving Consensus amongst a Globally Distributed Set of Servers," filed on Nov. 29, 2017, the entire contents of which are incorporated herein by reference.

TECHNICAL FIELD

The present disclosure generally relates to achieving consensus in a shared data structure, and more specifically to a leaderless, parallel, and topology-aware protocol for achieving consensus.

BACKGROUND

Some types of distributed applications rely on agreement on the entries of a shared data structure, such as a replicated transaction log or ledger. Examples of such distributed applications include geo-replicated database systems that support high-volume and conflict-free transaction processing, and private blockchains that continuously add records to a distributed ledger. Each entry may consist of a unit of computation that can read and modify the states of the application. Entries are processed in the order that they appear in the log or ledger.

In some instances, a distributed application, such as a geo-replicated database system, can employ distributed consistent replication to preserve the states of the distributed application data. The various participants benefit from agreement of each of the states of the distributed application. The agreement by the participants can be achieved using consensus protocols that process the replicated transaction log or ledger and every participant reaches consensus on the agreed order of the replicated transaction log or ledger. Highly distributed applications can have hundreds or thousands of participants across multiple physical locations. As the number of participants increases, the volume of individual requests also increases, which results in increased latency to reach agreement. Especially in a distributed application with a write-intensive workload, in order to reach consensus, every participant has to agree on the order of the write requests being processed. Executing the consensus protocol in a large scale distributed application results in greater latency and increased processing time to reach agreement among the large number of participants.

Many existing consensus protocols rely on a centralized coordinator (e.g., a leader) to service client requests and replicate state changes. However, employing the centralized coordinator results in a bottleneck by concentrating both processing load and network traffic at the centralized coordinator. This also results in unavoidable latency, and limits the ability to scale. While increasing the number of participants in this protocol can increase fault tolerance, the performance continues to degrade as each additional participant is added.

Other existing consensus protocols attempt to address the performance decrease as the scalability increases by moving from a single centralized coordinator to a set of coordinators. While having sets of coordinators servicing client requests and replicating state changes spreads out the amount of processing that was previously being performed by the single centralized coordinator, these consensus protocols still suffer in that message dissemination in these protocols is neither parallel, nor aware of the network topology. Their scalability is therefore still limited in wide-area deployments with restricted network link capacities.

It would be desirable to address these issues.

SUMMARY

The subject matter in this disclosure presents, among other things, a consensus protocol that can be employed to achieve consensus among a large set of highly distributed nodes processing read and write requests to a shared data structure. The consensus protocol achieves consensus by grouping the set of nodes into groups based on physical proximity. The execution of the consensus protocol can be divided into multiple consensus cycles, each of which consists of multiple rounds. In the first round of a consensus cycle, consensus is reached between the nodes of each individual group of nodes called a super-leaf. Consensus between sets of multiple groups is achieved in subsequent rounds, based on physical proximity of the groups to each other. In the first round of a consensus cycle, consensus is first being achieved at the level of individual groups of nodes in a super-leaf (e.g., in one example each node could be a server, and a group of nodes could be all the servers in a given rack). In the next round of the consensus cycle, consensus is achieved at the level of groups of groups based on physical proximity (e.g., a group of groups being all the racks in a given datacenter). This process is repeated for progressively larger groupings until consensus exists among all nodes in the set (e.g., all the datacenters in a region, all the regions on a continent, all the continents, etc.).

The division of the nodes into groups can be represented as a tree, with each group of nodes forming a super-leaf, comprised of all the nodes in the group and a virtual node representing the group as a whole. Multiple proximate super-leaves are children of virtual nodes one level above the leaf level of the tree, with groups of those virtual nodes being children of virtual nodes one level above that, and so on to the root. Consensus spreads between more and more nodes as the rounds of the consensus cycle progress. At the end of a consensus cycle, consensus exists between all of the nodes of the set, which can include, for example, thousands of nodes in multiple data centers on different continents. The size of the groups of nodes and what constitutes physical proximity are variable design parameters which can be set to different values in different implementations, as discussed in more detail below.

As noted above, in the first round of a consensus cycle, consensus is achieved between the individual nodes within each group of nodes. The individual nodes achieve consensus by each node sharing a proposal that includes all of the write requests received at that node during the previous cycle with all other nodes in the group. The proposals are then aggregated together and ordered, so that all of the nodes in the group agree on the ordering of the write requests received by the nodes in that group. In the second round of a consensus cycle, consensus is achieved at the next level among groups of groups of nodes by aggregating different groups write requests orderings into a single ordering and sharing that single ordering with all of the nodes in the different groups. In subsequent rounds of a consensus cycle, consensus is achieved at the next level (e.g., groups of groups of groups of nodes that are children of a given virtual node at the next level of the tree going towards the root) by continuing to aggregate the orderings of the write requests and sharing the aggregated ordering with all of the nodes in the groups. The consensus protocol completes in the nth round when global ordering among all of the nodes in the set is achieved and shared with each of the nodes. At this point, all of the nodes in the set agree on an identical ordered sequence of write requests to the shared data structure.

The consensus protocol is decentralized with each node executing steps of the consensus protocol independently and in parallel without requiring a centralized leader. Since the consensus protocol is decentralized, it can scale without increasing latency arising from traffic aggregation.

One general aspect of the subject matter in this disclosure is a computer-implemented method for achieving consensus among a plurality of nodes in a distributed system using a shared data structure, the plurality of nodes being organized into at least a first group of nodes, a second group of nodes, a third group of nodes, and a fourth group of nodes based on physical proximity or geographical proximity, the method including the steps of: receiving at a first node of the first group of nodes, client requests including one or more of read requests and write requests, the client requests being associated with portions of a shared data structure identified by unique keys; storing the client requests in a local buffer of the first node; initiating a first consensus cycle and labeling the first consensus cycle with a first cycle identifier; aggregating the client requests stored in the local buffer into a first node-level proposal responsive to the first consensus cycle being initiated; assigning a proposal number to the first node-level proposal, where the proposal number is a random number; broadcasting the first-node-level proposal to other nodes in the first group of nodes, where the other nodes are grouped into the first group of nodes based on physical proximity to the first node; receiving at the first node, shared node-level proposals broadcast by the other nodes in the first group of nodes, each shared node-level proposal being an ordered aggregation of client requests received by a corresponding node in the first group, each proposal number being a random number; aggregating the received shared node-level proposals and the first node-level proposal into an ordered first-group level proposal achieving a first-group level consensus; sharing the first-group level proposal with the second group of nodes of the plurality of nodes, the second group of nodes being separate from the first group of nodes and the second group of nodes being grouped based on physical or geographical proximity to each other; receiving from the second group of nodes, an ordered second-group level proposal, the second-group level proposal being an ordered aggregation of node-level proposals from nodes of the second group of nodes, each node-level proposal being an ordered aggregation of client requests received by a corresponding node of the second group and assigned a proposal number, the ordered second-group level proposal achieving a second-group level consensus; aggregating the ordered first-group level proposal and the ordered second-group level proposal into a first grouping of group level proposals, the first grouping of group level proposals achieving consensus between the first group of nodes and the second group of nodes; sharing the first grouping of group proposals with a second grouping of groups, the second grouping of groups including the third group of nodes of the plurality of nodes and the fourth group of nodes of the plurality of nodes; receiving a second grouping of group proposals from the second grouping of groups, the second grouping of group proposals achieving consensus between the third group of nodes and the fourth group of nodes; aggregating the first grouping of group proposals and the second grouping of group proposals into an ordered root level grouping achieving consensus between the plurality of nodes to complete the first consensus cycle; and writing the ordered root level grouping to the shared data structure. Other implementations of this aspect include corresponding computer systems, apparatus, and computer programs recorded on one or more computer storage devices, each configured to perform the actions of the method.

Implementations may include one or more of the following features. The computer-implemented method further including: initiating a second consensus cycle responsive to occurrence of a specific event. The computer-implemented method where the specific event further includes: receiving at the first node from another node of the plurality of nodes, a subsequent message with a higher cycle identifier than the first cycle identifier. The computer-implemented method where the specific event further includes: receiving an additional request at the first node from the client, after the first consensus cycle has been initiated; initiating an expiration of a time period responsive to receiving the additional request. The computer-implemented method further including: receiving a plurality of subsequent requests from the client; aggregating subsequent requests received after the additional request but before the expiration of the time period into a second consensus cycle node-level proposal. The computer implemented method further including: initiating the second consensus cycle prior to the first consensus cycle being completed. The computer-implemented method further including: prior to the first node sharing the first-group level proposal with the second group of nodes of the plurality of nodes, electing the first node as a representative of the first group of nodes using a local consensus protocol; and designating the elected representative of the first group of nodes to obtain the first-group level proposal from the second group of nodes of the plurality of nodes. The computer-implemented method further including: aggregating, the client requests into a first node-level proposal by the first node, in parallel with each shared node-level proposal being aggregated by the corresponding node in the first group of nodes. The computer-implemented method further including: responsive to receiving at the first node a first write request associated with a first portion of the shared data structure and identified by a first unique key, requesting a write lease for a future consensus cycle by the first node; including the write lease in the first node-level proposal, the write lease indicating to the plurality of nodes that any node of the plurality of nodes is allowed to execute write requests in the future consensus cycle to the first portion of the shared data structure identified by the first unique key. The computer-implemented method further including: determining at the first node, whether a write lease has been asserted for a specific portion of the shared data structure; responsive to determining that the write lease has not been asserted, executing one or more read requests associated with the specific portion of the shared data structure without waiting for an end of the first consensus cycle; refraining from executing write requests associated with the specific portion of the shared data structure during the first consensus cycle; and responsive to determining that the write lease has been asserted, executing one or more write requests associated with the specific portion of the shared data structure based on the ordered root-level grouping and executing the one or more read requests associated with the specific portion of the shared data structure at the end of the first consensus cycle. The computer-implemented method where the proposal number of the first node-level proposal and one of the proposal numbers of one of the shared node-level proposals associated with one of the other nodes in the first group of nodes are identical, the computer-implemented method further including: ordering the first node-level proposal and the shared node-level proposal using a first node identifier value associated with the first node and a second node identifier value associated with the one of the other nodes in the first group of nodes. The computer-implemented method where: physical proximity further includes one of a same rack, a same data center, and a same switch. The computer-implemented method where: geographical proximity further comprises one of a same city, a same region, a same state, a same province, a same country, and a same continent. The computer-implemented method where: sharing the first-group level proposal with the second group of nodes of the plurality of nodes further includes sharing the first-group level proposal with a pre-selected node from the second group of nodes, the pre-selected node being identified to receive the first-group level proposal based on an emulation table accessible by the first node. The computer-implemented method further including: instantiating the emulation table to indicate that the first node is a first emulator and the pre-selected node from the second group of nodes is a second emulator; and updating the emulation table responsive to a failure of one of the first emulator and the second emulator. The computer-implemented method further including: ordering the ordered root level grouping using proposal numbers for each of the node level proposals included in the first grouping of group proposals and the second grouping of group proposals. The computer-implemented method wherein aggregating client requests further comprises: aggregating write requests of the client requests stored in the local buffer into a first node-level proposal responsive to the first consensus cycle being initiated ordering the ordered root level grouping using proposal numbers for each of the node level proposals included in the first grouping of group proposals and the second grouping of group proposals. The computer-implemented method wherein each node-level proposal further comprises: an ordered aggregation of write requests received by a corresponding node. Implementations of the described techniques may include hardware, a method or process, and/or computer software (e.g., object code, executable images, etc.) in computer-accessible memory.

The above described general aspects and implementations can also be instantiated in the form of one or more servers and/or computer readable media.

Other implementations of one or more of these aspects and other aspects described in this document include corresponding systems, apparatus, and/or computer programs configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 7 is a flowchart of an example method for achieving consensus between a first group of nodes and a second group of nodes.

The Figures depict various example implementations for purposes of illustration only. One skilled in the art will readily recognize from the following discussion that other implementations of the structures and methods illustrated herein may be employed without departing from the principles described herein.

DETAILED DESCRIPTION

The technology described herein provides system and methods for achieving consensus among a plurality of distributed nodes servicing read and write requests to a shared data structure. In some implementations, the shared data structure is in the form of a permissioned ledger that may be shared between a plurality of nodes and that can be written to and read from by the nodes, one example of such being a permissioned blockchain. The nodes of the plurality can be classified into groups based on physical or geographical proximity. Groups of nodes can then be classified into larger groups (i.e., groups of groups) and this classification can be repeated progressively such that the final, largest grouping includes all of the nodes in the set. For example, a group of nodes in one implementation may be a rack of servers in a datacenter, all of the racks in the datacenter may be a group of groups, all of the datacenters in a given geographic region may be the next level grouping, all of the regions in a continent the next, and so on. Note the latency in the communication between nodes within successively smaller groupings tends towards being minimal (e.g., communication between servers in a single rack, but increases as the groupings become larger (e.g., communication between remotely located datacenters over a network as described elsewhere herein).

Nodes can receive and service requests from clients to read from and write to the shared data structure. Each client request may include a unique key that identifies the portion of the shared data structure to which the request is being directed. Consensus issues arise when multiple write requests received across multiple nodes target the same portion of the data structure. Consensus is achieved when each of the nodes agrees on the order in which to process the write requests.

Figure 1:
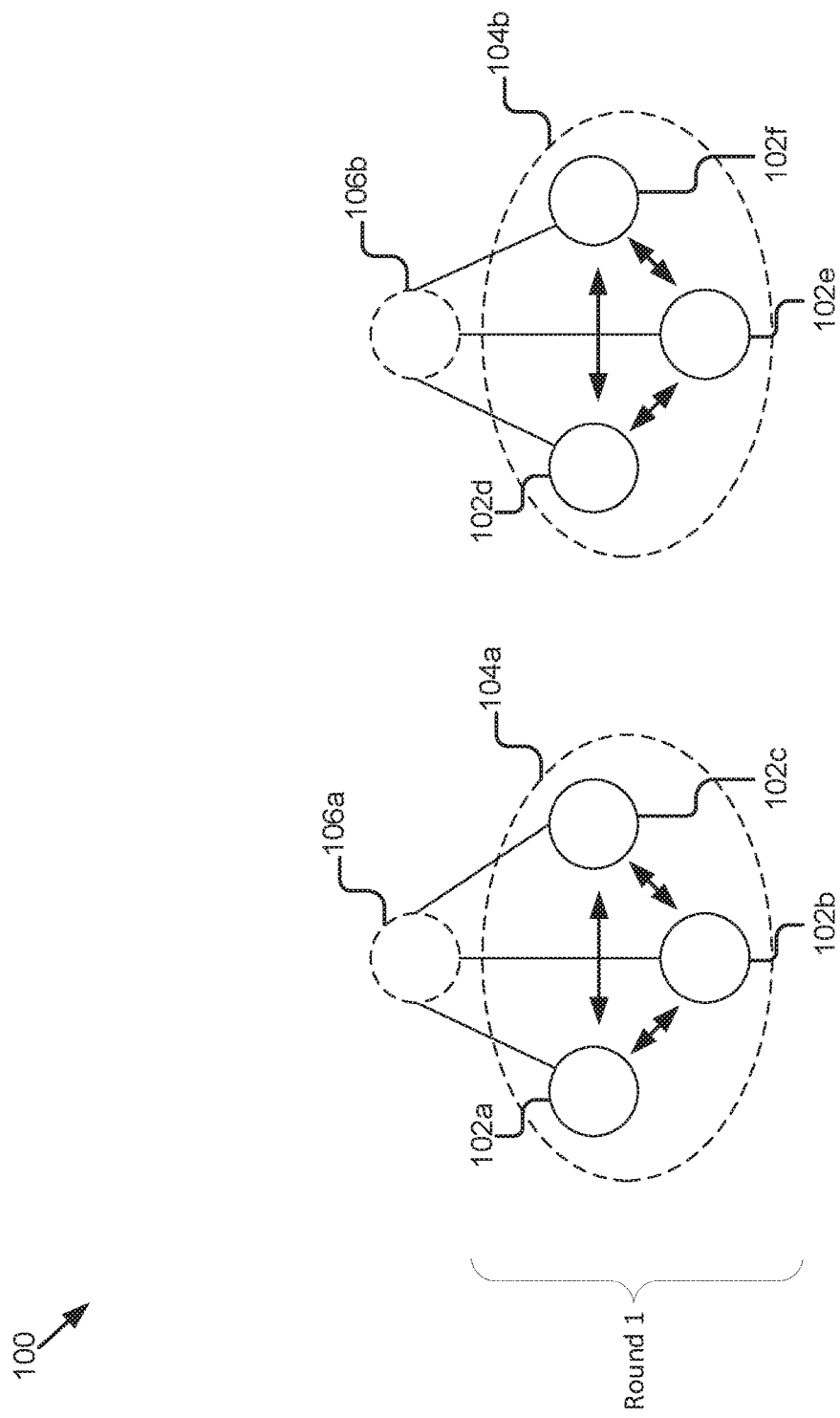
FIG. 1 is a block diagram illustrating a configuration of a group of nodes configured for achieving consensus.

FIG. 1 is a block diagram illustrating a configuration 100 of two separate group of nodes 104 achieving consensus in a first cycle of the consensus protocol. As described in more detail below, nodes can be implemented in the form of computing devices, such as physical rack mounted servers or VMs running on underlying physical computing devices. A first node 102a is part of a first group of nodes 104a that also includes other nodes 102b and 102c. As described in detail below, the states of the first node 102a and the other nodes 102b-c can be shared using the consensus protocol, and a virtual node 106a may be used to represent the consensus state of the first group of nodes 104a once the write requests received by each member of the group has been aggregated, ordered, and agreed on by each of the nodes in the first group 104a.

FIG. 1 also illustrates a second node 102d which is part of the second group of nodes 104b. In the implementation illustrated in FIG. 1, the second group of nodes 104b also includes other nodes 102e and 102f. As with the first group of nodes 104a, the states of the second node 102d and the other nodes 102e-f of the second group 104b may be shared with each other according to the consensus protocol, and a virtual node 106b associated with the second group 104b can be used to represent the consensus state of the second group of nodes 104b.

As noted above the entire set of nodes can be classified as a hierarchal logical tree structure, in which these group of nodes illustrated in FIG. 1 can be referred to as a super-leaves ("super" because each of these leaves actually comprises multiple nodes). It is to be understood that the although each of groups of nodes 104 illustrated in FIG. 1 contains only three nodes 102 for clarity of illustration and explanation, in practice a super-leaf can comprise more nodes 102, and in some instances includes many more. In addition, FIG. 2 only illustrates two groups of nodes 104 for clarity of illustration and explanation, while in practice the plurality of nodes may consist of more than two groups 104n, including orders of magnitude more in some instances.

As noted above, nodes 102 receive requests from clients to read from and write to the shared data structure. A unique key can identify a specific portion of the shared data structure targeted by such a request. Referring to the example illustrated by FIG. 1, the first node 102a may receive a request from a client to read from or write to a portion of the shared data structure identified by a specific unique key. For example, a client may send a request to write the value of 1 to a portion of a data structure that is identified by the unique key 12141213. Contemporaneously with the write request received by the first node 102a, a separate client may send a second request to another node, such as node 102b, or a node in a different group of nodes. The second request could be a request to write a value of 2 to the same portion of the data structure identified by the unique key 12141213. In this example, both requests are received at different nodes 102 contemporaneously. In this limited example, consensus is achieved when every node in the plurality agrees on the order in which to execute these two contemporaneous write requests. Although this example just discusses two contemporaneous requests, in practice, many requests can be received contemporaneously by many different nodes.

As described in more detail below, the plurality of nodes that have access to the shared data structure can execute the consensus protocol to achieve consensus between requests associated with the same portion of the shared data structure. In some implementations, the consensus protocol is executed in rounds of consensus cycles. During each round, each grouping of nodes at the same virtual level of the tree into which the nodes are virtually organized achieves consensus. Thus, in the first round, each super-leaf level group of nodes reaches internal consensus in parallel. In the next round, each super-leaf level virtual node (representing the consensus state of its corresponding super-leaf) passes its consensus state up to the next virtual level, at which consensus is achieved with other groupings of nodes at that virtual level, and so on until the root level is reached. As noted above, while only two groups of nodes 104a-b are illustrated in FIG. 1, any configuration of groups of nodes 104 is contemplated, and the protocol can scale to manage many groups of nodes 104. In the example shown in FIG. 1, the first group of nodes 104a and the second group of nodes 104b are both in round one of the consensus cycles and the results of the consensus in the first round may be represented as virtual node 106a-b.

Prior to a start of round one of a consensus cycle, each node in a given group can store the write requests it receives in a local buffer. By storing the requests in a local buffer, when a consensus cycle is initiated, each of the nodes in each group can quickly access the requests without having to retrieve any requests stored remotely. In some implementations, each of the nodes stores all of the requests received during a previous consensus cycle. When a new consensus cycle is initiated, in the first round of the new consensus cycle each node in each separate group of nodes (for example each nodes in first and second groups 104 illustrated in FIG. 1) aggregates all of the write requests stored in its local buffer into a node-level proposal. The node-level proposals are separate for each node 102 and represent all of the write requests received by that node 102 that have not yet been ordered for consensus in previous consensus cycles. A node level proposal can comprise all of the write requests received by the given node, in the order in which they were received. In some implementations, each node-level proposal may be assigned a proposal number for ordering of the node-level proposals. In some implementations, the proposal number is a large random number, such that the probability of multiple node-level proposals having the same proposal number, even in a large plurality of nodes, is very low. In further implementations, the proposal number may be a cryptographic hash of the proposal itself. In some implementations, if multiple node-level proposals are assigned the same proposal number, then these node-level proposals may be ordered based on node identifiers of corresponding nodes associated with the given node-level proposals. The node-level proposal allows for all of the requests at each node to be kept together, even as the consensus protocol moves up the logical tree structure with a large plurality of nodes.

As noted above, in some implementations read requests are not included in node-level proposals. Instead, read requests can be kept in the node-level local buffers, with each node keeping track of when a read request is received relative to an ordering of write requests. Once consensus has been achieved, such as by reaching consensus at the root-level node of a logical tree structure, each node can process the read requests locally by reading out the values at the portions of the shared data structure based on the ordering of when the read requests were received relative to the value stored at that time in the shared data structure based on the global ordering of the write requests as per the tree level consensus. By managing all read requests locally, the execution of the consensus cycle does not have to use bandwidth and processing power ordering and sending read requests between different nodes of the plurality.

Referring to the specific example implementation in FIG. 1, during round one of the consensus cycle, the first node 102a communicates its node-level proposal with the other nodes 102b-c in the first group of nodes 104a. Likewise, the other nodes 102b-c communicate their respective node-level proposals to the first node 102a, and to each other. In some implementations, each of the nodes in the first group communicates with the others using a conventional reliable broadcast protocol, for example Raft, Paxos, etc. Using the reliable broadcast protocol allows each of the nodes in a group to broadcast messages to the others, and assures that each of the node-level proposals have been shared across the group despite the possibility of message loss and/or node failure. Note that using the reliable broadcast protocol enables the first group of nodes 104a to share all of the node-level proposals among all of the nodes of the group, without requiring any one of the nodes 102 to function as a leader that would individually manage all of the node-level proposals by receiving all of the node-level proposals and then distributing each of them to all of the nodes of the group. By not requiring a leader, each of the nodes in the first group of nodes 104a can operate in parallel responsive to the consensus cycle being initiated, sharing their node-levels proposal in parallel, which improves processing times.

Once each node in the first group of nodes 104a has received node-level proposals from all of the nodes 102 a-c in the first group of nodes 104a, the first group of nodes 104a may achieve a first-group level consensus by each of the nodes in the group ordering all of the node-level proposals of the group, using the proposal numbers of each node-level proposal. Consensus is achieved in that all of the nodes in the first group now have the same ordering for executing of the write requests in the different node-level proposals against the shared data structure. If two or more of the write requests are directed to the same portion of the data structure, all of the nodes in the first group agree on the order in which these multiple write requests are to be executed.

While, the above example describes achieving super-leaf group-level consensus during round one of a consensus cycle by the first group of nodes 104a, it is to be understood that the functionality is applied in parallel by the second group of nodes 104b (and every other super-leaf level group of nodes in the plurality). Thus, at the end of the first round of a consensus cycle, each super-leaf has group-level consensus. As shown in FIG. 1, the first virtual node 106a represents the ordered node-level proposals in the logical tree structure for the first group 104a, and the second virtual node 106b represents the ordered node-level proposals in the logical tree structure for the second group 104b. It is to be understood that virtual nodes 106 are not actual physical nodes, but logical constructs for tracking consensus at different levels of groupings of nodes in the logical tree structure.

Figure 2:
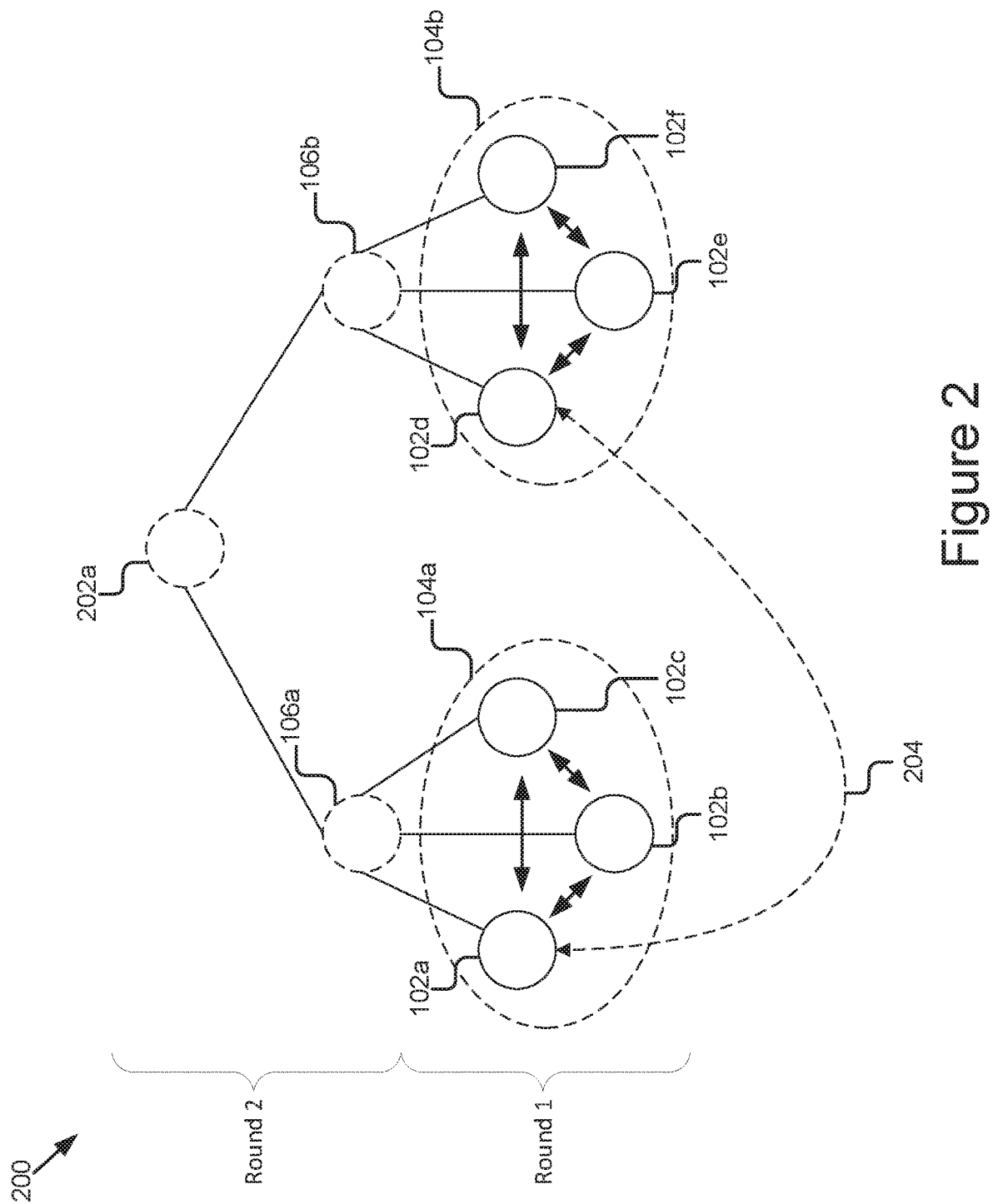
FIG. 2 is a block diagram illustrating a configuration of a group of nodes achieving consensus in a consensus cycle.

FIG. 2 is a block diagram illustrating a configuration 200 of a group of nodes achieving consensus in round two of a consensus cycle of the consensus protocol. In the example implementation illustrated in FIG. 2, the node 102a of the first group of nodes 104a and the node 102d of the second group of nodes 104b are elected as representatives of the first group of nodes 104a and the second group of nodes 104b, respectively. In some implementations, a representative of a group of nodes 104 may be elected after the group of nodes 104 achieves internal consensus in round one of the consensus cycle. In some implementations, the representatives may be elected prior to a round of the consensus cycle, and may continue to act as representatives during a current round of the consensus cycle. In some implementations, the representative node 102 of a specific group of nodes 104 is elected from that group of nodes 104 using a local consensus protocol. In some implementations, the local consensus protocol may be used to elect more than one node as representatives of the specific group. Multiple representatives may be used within a single group of nodes 104 to provide redundancy in case of a failure of a representative node. Nodes 102 in a group 104 can vote or designate which node(s) 102 are to act as representative(s) for the group 104, until a majority of the nodes 102 agree which node(s) 102 are to be the representatives for the group 104. It is to be understood that each group of nodes 104 selects or elects one or more representatives in parallel.

In the implementation illustrated in FIG. 2, the node 102a in the first group 104a is designated as the representative, and contacts nodes in other separate groups of nodes. For example, in FIG. 2 node 102a may contact 204 the node 102d in the second group of nodes 104b. In some implementations, the representative node of a one group may contact a node in a separate group designated as an emulator. In some implementations, an emulator may be a node that has been previously designated by the consensus protocol as being available for contact from representative nodes. In some implementations, a representative node may identify an emulator using an emulation table that lists previously designated emulators and provides the information to the representative node for the representative node to contact the emulators. In some implementations, any node 102 in a group of nodes 104 may be eligible to be designated as an emulator. In some implementations, if a node designated as an emulator fails, another node in that group of nodes may designated as the emulator, and the emulation table may be updated to reflect that change. In some implementations, nodes designated as representatives are also designated as emulators. Emulation tables store the mapping from an emulator to its Internet address. Techniques of instantiating and managing emulation tables are known to those of ordinary skill in the relevant art, and the use of emulation tables within the context of the consensus protocol will be apparent to those of such a skill level in light of this specification.

In some implementations, during the process of contacting the emulator, the representative node 102 may retrieve proposals associated with the group of nodes 104 represented by that emulator. For example, as shown in FIG. 2, during round two of the consensus cycle, node 102a, which has been designated as a representative of the first group 104a, contacts 204 node 102d, which has been designated as an emulator of the second group 104b. Node 102a retrieves an ordered grouping of node-level proposals for the second group of nodes 104b that was previously aggregated and ordered at virtual node 106b during round one of the consensus cycle. The ordered grouping of node-level proposals represents an ordering of all of the write requests received at each of the nodes 102d-f of the second group of nodes 104b, similar to the ordered node-level proposals of the first group of nodes 104a that were ordered during round one as described above in conjunction with FIG. 1. Once node 102a has retrieved the ordered grouping of node-level proposals from the node 102d, node 102a may aggregate and order the node-level proposals of the second group of nodes 104b with the node-level proposals of the first group of nodes 104a, using the proposal numbers of each node-level proposal to obtain a total ordered grouping, referred to herein as an ordered grouping of group level proposals. The representative may then broadcast that ordered grouping of group level proposals to other nodes 102b-c in the first group of nodes 104a. By doing this, all of the nodes in the first group of nodes 104a have the same order for how write requests received at both the first group of nodes 104a and the second group of nodes 104b are to be processed to the shared data structure. All of the nodes 102 of the first group 104a now have consensus at the level of a grouping of groups, which in this example comprises just two groups: the first group of nodes 104a and the second group of nodes 104b.

Similar to how node 102a acts as a representative of the first group 104a and retrieves the node-level proposals of the second group of nodes 104b from an emulator, the node 102d (or another node 102e-f) may act as a representative of the second group 104b, and contact an emulator within the first group of nodes 104a, designated as node 102a in the example in FIG. 2. The node 102d may then retrieve the ordered node-level proposals of the first group of nodes 104a and may aggregate, order, and broadcast a grouping of group level proposals to other nodes in the second group of nodes 104b, allowing the second group of nodes 104b to achieve the same grouping of groups-level consensus of the ordering of write requests as the first group of nodes 104a. Round two of the consensus protocol is now complete for this grouping of groups.

As shown in FIG. 2, virtual node 202a is a logical representation of the ordered grouping of group level proposals, and represents the ordered states of both the first group of nodes 104a and the second group of nodes 104b. In some implementations, the sharing of each groups ordered node-level proposals may be performed in parallel to reduce the time and latency to achieve consensus in the second round. In some implementations, the consensus protocol may use more than one representative from each group of nodes to mitigate against network latency and message loss and once the results are obtained from the fastest representative, the results from the other representatives can be ignored to improve the processing time.

It is to be understood that although FIG. 2 illustrates a group of groups that comprises only two groups, in other implementations grouping of groups can be larger. For example, in an implementation where a node 102 comprises a rack mounted server, and a group comprises all of the servers mounted on a single rack, a grouping of groups could comprise, for example, all of the racks positioned in a single row of a datacenter. It is to be further understood that during the second round of the consensus protocol, multiple groupings of groups can be achieving second round level consensus in parallel.

Figure 3:
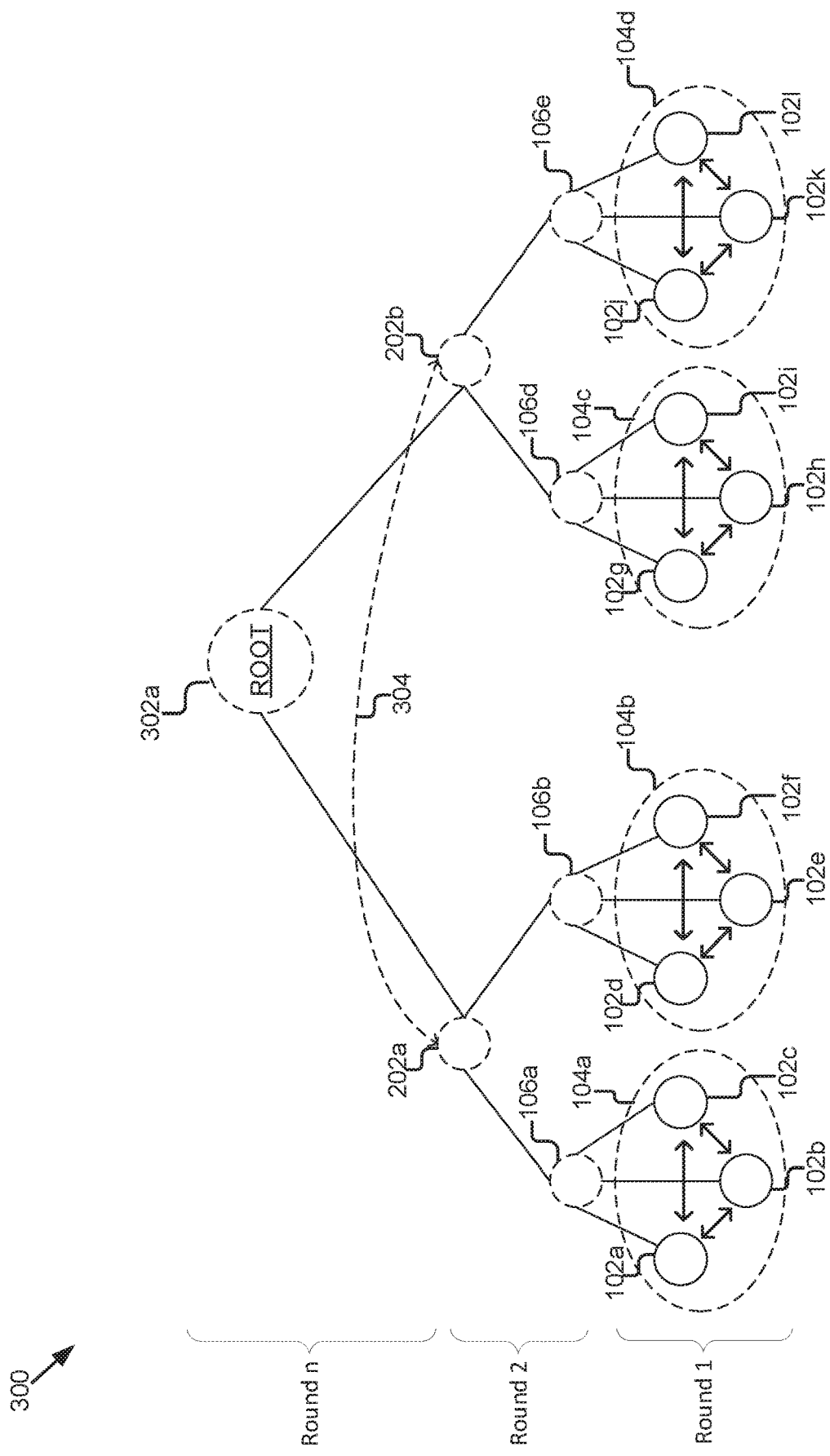
FIG. 3 is a block diagram illustrating a root level grouping of nodes.

FIG. 3 is a block diagram illustrating an nth level logical grouping 300, in which the nth level virtual node is the root node 302a. In the example illustrated in FIG. 3, there are two second level groupings of groups, one of which is the one illustrated in FIG. 2, which comprises the first group 104a and the second group 104b, which are children of second level virtual node 202a. The second grouping of groups illustrated in FIG. 3 comprises a third group of nodes 104c and a fourth group of nodes 104d, which are children of second level virtual node 202b. As shown, the third group of nodes 104c comprises nodes 102g, 102h, and 102i, and level one virtual node 106d, and the fourth group of nodes 104d comprises nodes 102j, 102k, and 102l, and level one virtual node 106e. As the first group 104a is achieving first round group level consensus is described in conjunction with FIG. 1, so too would the second, third and fourth groups 104b-d be achieving first round group level consensus in parallel. Likewise, as the first and second groups are achieving second round grouping of groups level consensus as described in FIG. 2, the third and fourth groups 104c-d would also be achieving second round grouping of groups level consensus in parallel.

In the example illustrated in FIG. 3, the second round grouping of group level proposals represented by virtual nodes 202a and 202b may be shared by a designated representative node for the 202a grouping of groupings (e.g., node 102a in the first group 104a) and a node designated as an emulator for the 202b grouping of groups (e.g., node 102g in the third group 104c). As represented by 304, node 102a may retrieve the grouping of group level proposals represented by virtual node 202b that represents all of the ordered node-level proposals of the third group of nodes 104c and the fourth group of nodes 104d. In parallel, node 102g may retrieve the ordered grouping of group level proposals represented by virtual node 202a that represents all of the ordered node-level proposals of the first group of nodes 104a and the second group of nodes 104b. The multiple ordered grouping of group level proposals can then be aggregated and ordered. The ordered grouping of all of the node-level proposals of plurality of nodes can be referred to as an ordered root level grouping.

When each of the representatives of each of the group of nodes shares the root level grouping with the other nodes in their groups of nodes, each node will have the history of every write request ordered during the consensus cycle, and consensus among the plurality of nodes is achieved. For example, once the root level grouping has been received by representative node 102a and node 102a has aggregated and ordered the root level grouping, then the representative node 102a can distribute that ordered root level grouping to the other nodes for which node 102a is a representative node. For example, with respect to FIG. 3, node 102a represents both group 104a and group 104b at the root level grouping, so node 102a may broadcast the ordered root level grouping to node 102d of the second group 104b. Then both node 102a and node 102d can broadcast the ordered root level grouping to the other nodes in their respective groups 104a-b, thus allowing all of the nodes in that portion of the super-leaf structure to have the same ordered root-level grouping. It should be understood that other nodes in that root-level grouping (such as representative 102g) may similarly broadcast the ordered root-level grouping out to other representatives and nodes in that portion of the super-leaf structure. Once the root level grouping has been shared among the nodes of each super-leaf level group, the consensus cycle terminates, and another consensus cycle may begin during which the write requests that were stored and buffered during the consensus cycle that just completed are processed. In some implementations, each consensus cycle may be labelled, such as with a monotonically increasing cycle identifier.

FIG. 3 illustrates a root node 322 as being at level three of logical tree structure (with the leaves being level one and level numbers increasing as the tree is traversed towards the root). Thus, in this example, the root node 322 is during the third round of the consensus cycle. It is to be understood that the logical tree structure can comprise many more levels, and the process of achieving consensus among respectively larger groupings of groups can be repeated during n-rounds of the consensus cycle, until the root node 322 of the logical tree structure is reached, representing that consensus among all nodes in the plurality of nodes has been achieved.

In some implementations, the consensus protocol may allow for multiple rounds of different consensus cycles to be happening in parallel, referred to herein as pipelining. For example, a third round of a first consensus cycle may be processing in parallel with a second round of a second consensus cycle and a first round of a third consensus cycle. In the first consensus cycle, the write requests received prior to the start of the first consensus cycle are ordered. In the second consensus cycle, the write requests received in the time between the start of the first consensus cycle and the start of the second consensus cycle are ordered. In the third consensus cycle, the write requests received in the time between the start of the second consensus cycle and the start of the third consensus cycle are ordered. By pipelining the consensus cycles, throughput is increased. This allows for multiple processes to be occurring while waiting for representatives that exchange messages with distant emulators, as new consensus cycles can start while a current cycle is ongoing. The pipelining will not results in errors as long as the consensus cycles are completed in the numerical order of the cycle identifiers.

In some implementations, a consensus cycle may be initiated responsive to a one or more conditions and allow for self-synchronization. A first condition that may initiate a new consensus cycle may be when a node receives a message from another node that has a higher cycle identifier than the node's own highest identifier. A second condition that may initiate a new consensus cycle may be when a node receives a message from a client after the previous consensus cycle, in which case, the message would be stored in the local buffer and unless the first condition holds, the node may initiate a new consensus cycle at the end of a certain time period. In some implementations, the time period may be designated as a changeable parameter to optimize the consensus protocol, and all client requests that may be received during this time period may be aggregated into a single node-level proposal during a new consensus cycle. By using the first condition and the second condition, the consensus protocol can be self-clocked, meaning there is no need for a master time-keeper to oversee the various consensus cycles. Instead, a new cycle will eventually be triggered responsive to new requests being received. In some implementations, this also allows the nodes to become dormant and not waste resources when no requests are being received.

As discussed above, read requests arriving at a node are not made part of the proposals according to the consensus protocol. Instead, each node keeps track of the last update of write requests that were received before each one of its own reads. When a consensus cycle terminates, these reads can be responded to correctly without requiring a node to know about reads at any other nodes. In some implementations, read optimizations can be performed, for example where read requests predominate. In some implementations, any node may request a write lease for a specific future consensus cycle covering a portion of the shared data structure identified by a specific key. The write lease for that specific portion of the shared data structure can be distributed to all nodes of the plurality, as described elsewhere herein. Once the write lease for the portion of the shared data structure is known by the plurality of nodes, then for the specific future consensus cycle, any node of the plurality of nodes is allowed to execute a write request to the portion of the shared data structure identified by the specific key. The consensus protocol orders all of those write requests, as described elsewhere herein. By contrast, none of the nodes in the plurality may write to those portions of the shared data structure that are not covered by an asserted write lease. This allows for any node that has a read request to execute that read request on one of those portions of the shared data structure without a write lease, without waiting for the total ordering of the write requests at the end of the consensus cycle, since the value being read out of the shared data structure will not be overwritten during that consensus cycle. This significantly reduces the latency for read requests, in that some of the read requests can be executed without waiting for the end of the consensus cycle. If a write lease is asserted on a portion of the shared data structure which a client has submitted a read request to, then the read request will be executed after the end of the consensus cycle when the write requests to that portion of the shared data structure have been ordered.

Figure 4:
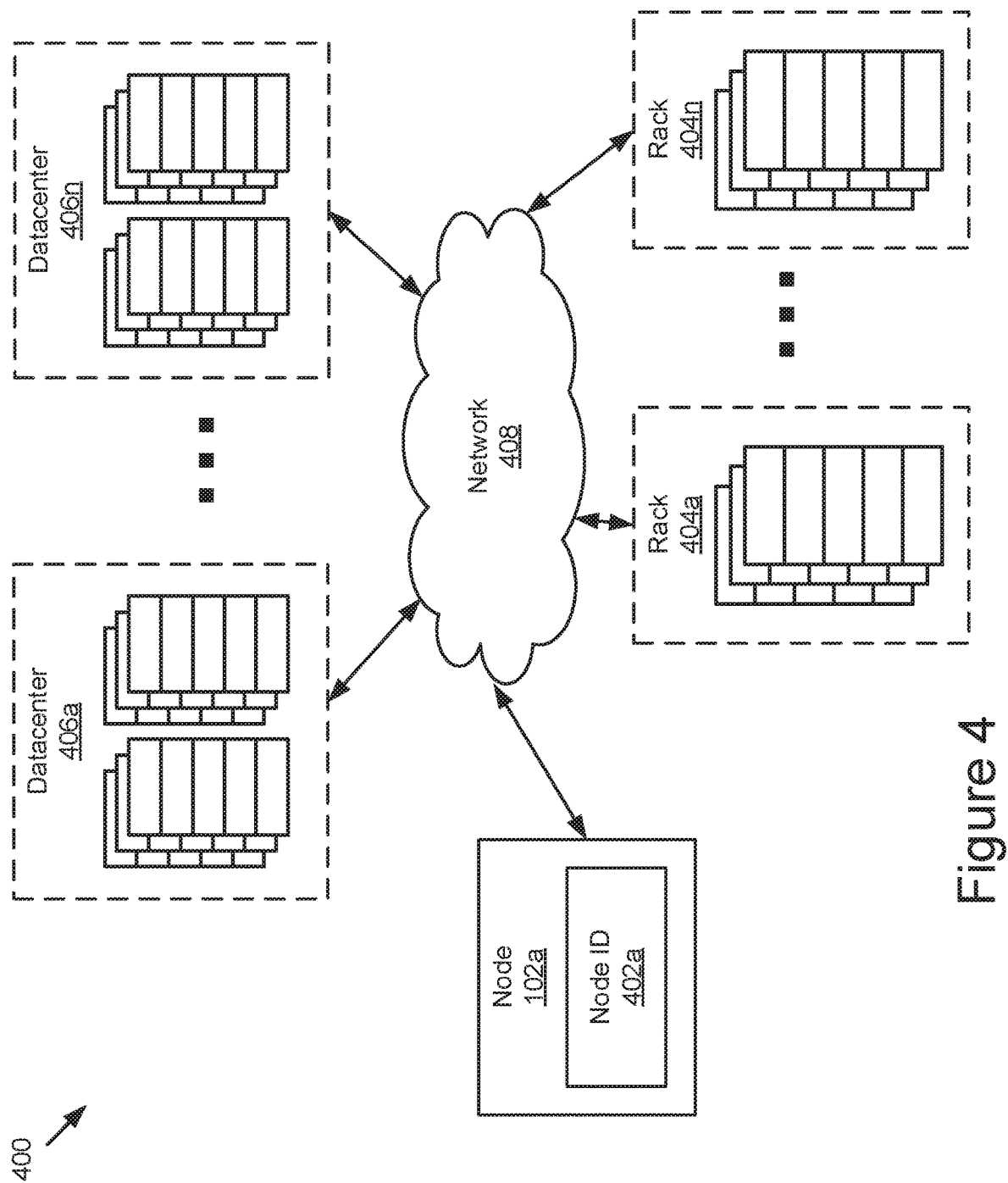
FIG. 4 is a block diagram of an example of a distributed system of nodes.

FIG. 4 is a block diagram of an example distributed system 400 of nodes 102 across which the consensus protocol described herein can be applied to achieve consensus among the nodes 102 on the order of write requests to the shared data structure. In some implementations, the distributed system 400 can include nodes such as node 102a, communicating with other nodes in racks 404a . . . 404n (also referred to individually and collectively as 404) and/or data centers 406a . . . 406n (also referred to individually and collectively as 406) using a network 408. In some implementations, each node such as node 102a can include a node ID 410a. A node ID 410 can be in the form of a unique identifier, such as a numerical identifier, such that each node 102 in the distributed system is designated by a unique node ID 410. In some implementations, a rack 404 may include one or more nodes 402b . . . 402n that are similar to node 102a. In some implementations, one or more racks 404 may be stored within a given datacenter 406, and can be located more and less physically proximate to each other, such as on the same shelf, in the same row, in the same wing of a building, in different sections of the same building, in different building on the same campus, etc. Datacenters 406 may be located at varying distances from each other, such as in the same city, state, province, region, country, continent, etc. The use of the nomenclature "a" and "n" in the reference numbers indicates that any number of those elements having that nomenclature may be included in the system 400

The network 408 may include any number of networks, subnetworks, and/or network types. For example, the network 408 may include, but is not limited to, one or more wide area networks (WANs) (e.g., the Internet, private WANs), local area networks (LANs), wireless wide area network (WWANs), WiMAX® networks, peer-to-peer networks, mobile (cellular) networks, Bluetooth® communication networks, other interconnected data paths across which multiple computing devices may communicate, various combinations thereof, etc.

As noted above, nodes 102 may be in the form of hardware servers, server arrays, storage devices and/or systems, etc., and/or may be distributed/cloud-based. In some implementations, nodes can be in the form of virtual machines, which operate as guests in a host server environment and, access the underlying physical hardware of the host via an abstraction layer (e.g., a hypervisor or other type of virtual machine manager).

Figure 5:
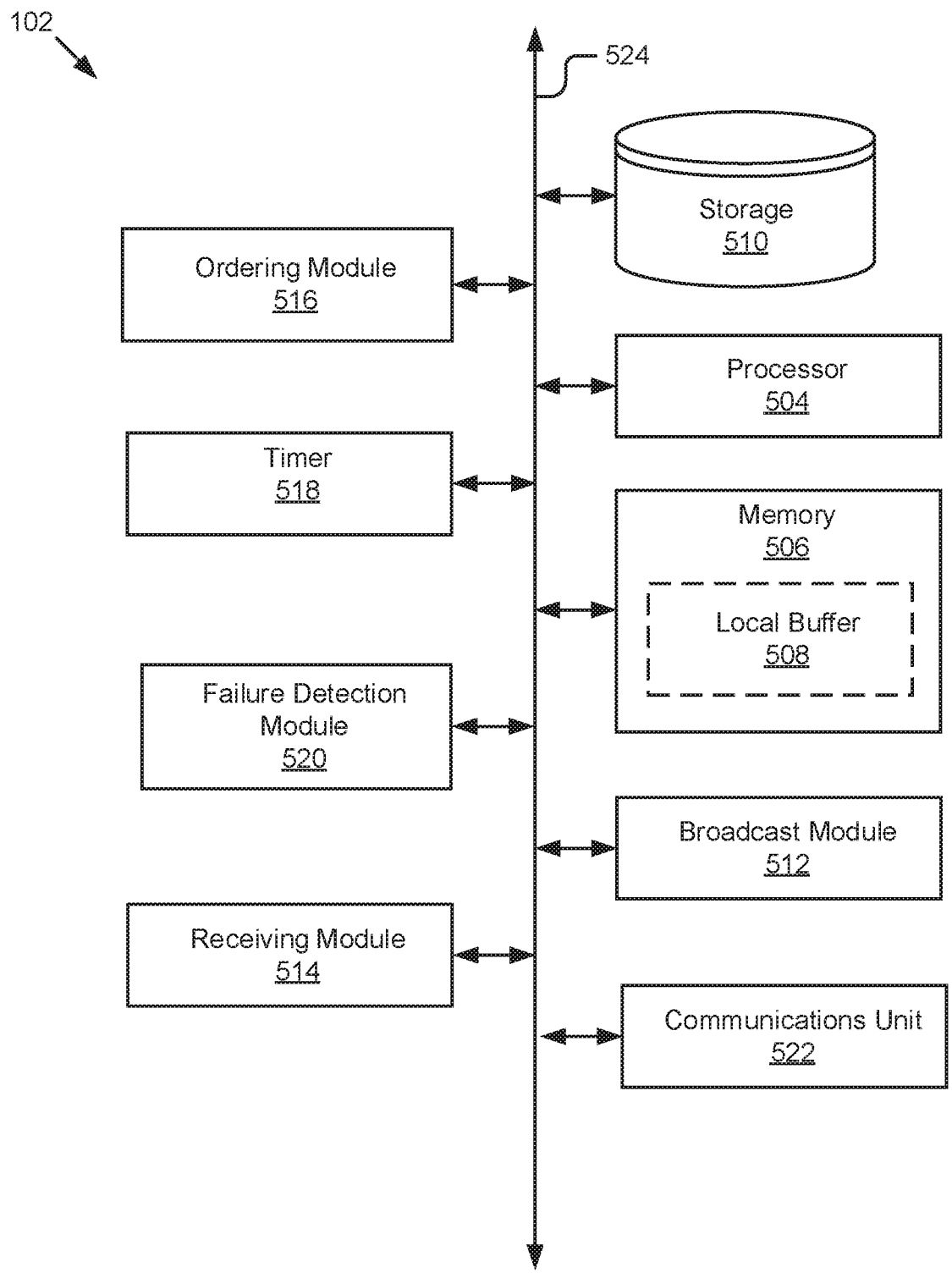
FIG. 5 is a block diagram of an example node.

FIG. 5 is a block diagram of an example node 102 according to some implementations. As depicted, the node 102 may include storage 510, processor 504, memory 506, broadcast module 512, receiving module 514, ordering module 516, timing module 518, failure detection module 520, and/or communications unit 522 which are communicatively coupled by a communications bus 522. However, it should be understood that the node 102 is not limited to such components, and may include more, fewer, and/or different elements, including, for example, those discussed with reference to the FIGS. 1-4.

The processor 504 may execute software instructions by performing various input/output, logical, and/or mathematical operations. The processor 504 has various computing architectures to process data signals including, for example, a complex instruction set computer (CISC) architecture, a reduced instruction set computer (RISC) architecture, and/or an architecture implementing a combination of instruction sets. The processor 504 may be physical and/or virtual, and may include a single core or plurality of processing units and/or cores. A single node 102 may include multiple processors 504.

The memory 506 is a non-transitory computer-readable medium that is configured to store and provide access to data to the other elements of the node 102. In some implementations, the memory 506 may store instructions and/or data that may be executed by the processor 504. For example, the memory 506 may store the requests from the client and execute those requests on the shared data structure. The memory 506 is also capable of storing other instructions and data, including, for example, an operating system, hardware drivers, other software applications, data, etc. The memory 506 may be coupled to the bus 524 for communication with the processor 504 and the other elements of the node 402. In some implementations, the memory 506 may include a local buffer 508 where requests may be temporarily stored for further processing. Memory 506 can be in the form of RAM, ROM, flash memory and/or other forms of computer accessible readable media.

The communication unit 522 may include one or more interface devices (I/F) for wired and/or wireless connectivity with the network 408 and/or other devices. In some implementations, the communication unit 522 may include ports for wired connectivity with other devices. In some implementations, the communication unit 522 may be configured to receive and send requests to and from a client using an application configured to communicate with the node 102 and client device. In some implementations, the communication unit 522 may include transceivers for sending and receiving wireless signals. For instance, the communication unit 522 may include radio transceivers for communication with the network 106 and for communication with nearby devices using close-proximity (e.g., Bluetooth®, NFC, etc.) connectivity.

The broadcast module 512 may include software and/or logic for broadcasting proposals to other nodes in the plurality of nodes. The broadcast module 512 may be coupled to the processor 504, memory 506, and/or communication unit 512 to send and receive information to one or more other nodes 102.

The receiving module 514 may include software and/or logic for receiving proposals from other nodes in the plurality of nodes. The receiving module 514 may be coupled to the processor 504, memory 506, and/or communication unit 512 to send and receive information to one or more other nodes 102.

The ordering module 516 may include software and/or logic for ordering node-level proposals within the node 102. The ordering module 516 may be coupled to the processor 504, memory 506, and/or communication unit 512 to send and receive information to one or more other nodes 102 and/or the shared data structure.

The timer 518 may include software and/or logic timing a broadcast or request from node 402a to another node 402n. The timer 518 may include adjustable timeout and failure options for dealing with request that exceed the timer parameters. The timer 518 may be coupled to the processor 504, memory 506, and/or communication unit 512 to send and receive information to one or more other nodes 102 and/or clients.

The failure detection module 520 may include software and/or logic for determining if the node 102a or another node 102n has failed. The failure detection module 520 may be coupled to the processor 504, memory 506, and/or communication unit 512 to send and receive information to one or more other nodes 402 to communicate a node failure.

The storage 510 can be a combination of software and/or hardware for storing, structuring, and providing access to data. In some implementations, the storage 510 may include a portion of a shared data structure, such as a blockchain or distributed ledger. The storage 510 may include a database or other storage mechanism that can be used to store, organize, and/or access information associated with the shared data structure and/or client requests.

The underlying storage hardware can be in the form of electro-mechanical disks, solid state disks, RAM, other forms of computer accessible memory, etc. In some implementations, the storage 510 may be or instantiated in conjunction with a distributed data store, such as a cloud-based computing and/or data storage system. In some implementations, the storage 510 may include a database management system (DBMS). For example, the DBMS could be a structured query language (SQL) DBMS. For instance, storage 510 may store data in an object-based data store or multi-dimensional tables comprised of rows and columns, and may manipulate, i.e., insert, query, update, and/or delete, data entries stored in the verification data store using programmatic operations (e.g., SQL queries and statements or a similar database manipulation library). Additional characteristics, structure, acts, and functionality of the storage 510 is discussed elsewhere herein.

The modules of the node 102 can be instantiated (for example as object code or executable images) within the memory 506 (e.g., RAM, ROM, flash memory), such that when the processor 504 processes a module, the node 102 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the node 102 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 6A:
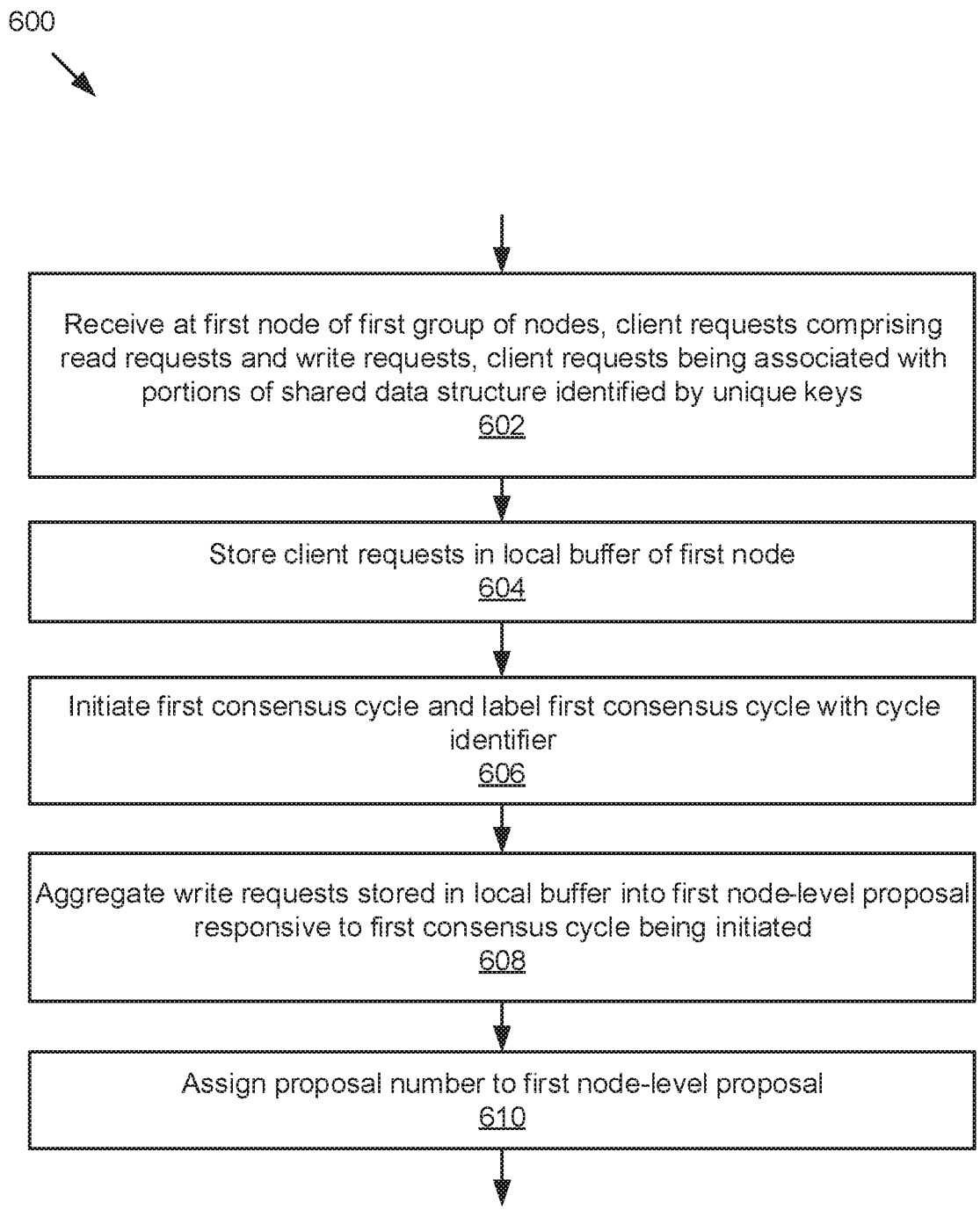
FIGS. 6A and 6B are flowcharts of example methods for achieving group level consensus.

FIG. 6A is a flowchart of an example method 600 for achieving group level consensus. At 602, a first node 102a of a first group of nodes 104a may receive a client request comprising one or more of a read request and a write request. The client request may be associated with a portion of a shared data structure identified by unique keys. At 604, node 102a may store the client requests in a local buffer. At 606, a consensus protocol may be initiated as a first consensus cycle and the first consensus cycle may be labeled with a cycle identifier. At 608, node 102a may aggregate the write requests stored in the local buffer into a first node-level proposal responsive to the first consensus cycle being initiated. At 610, node 102a assigns a proposal number to the first node-level proposal.

Figure 6B:
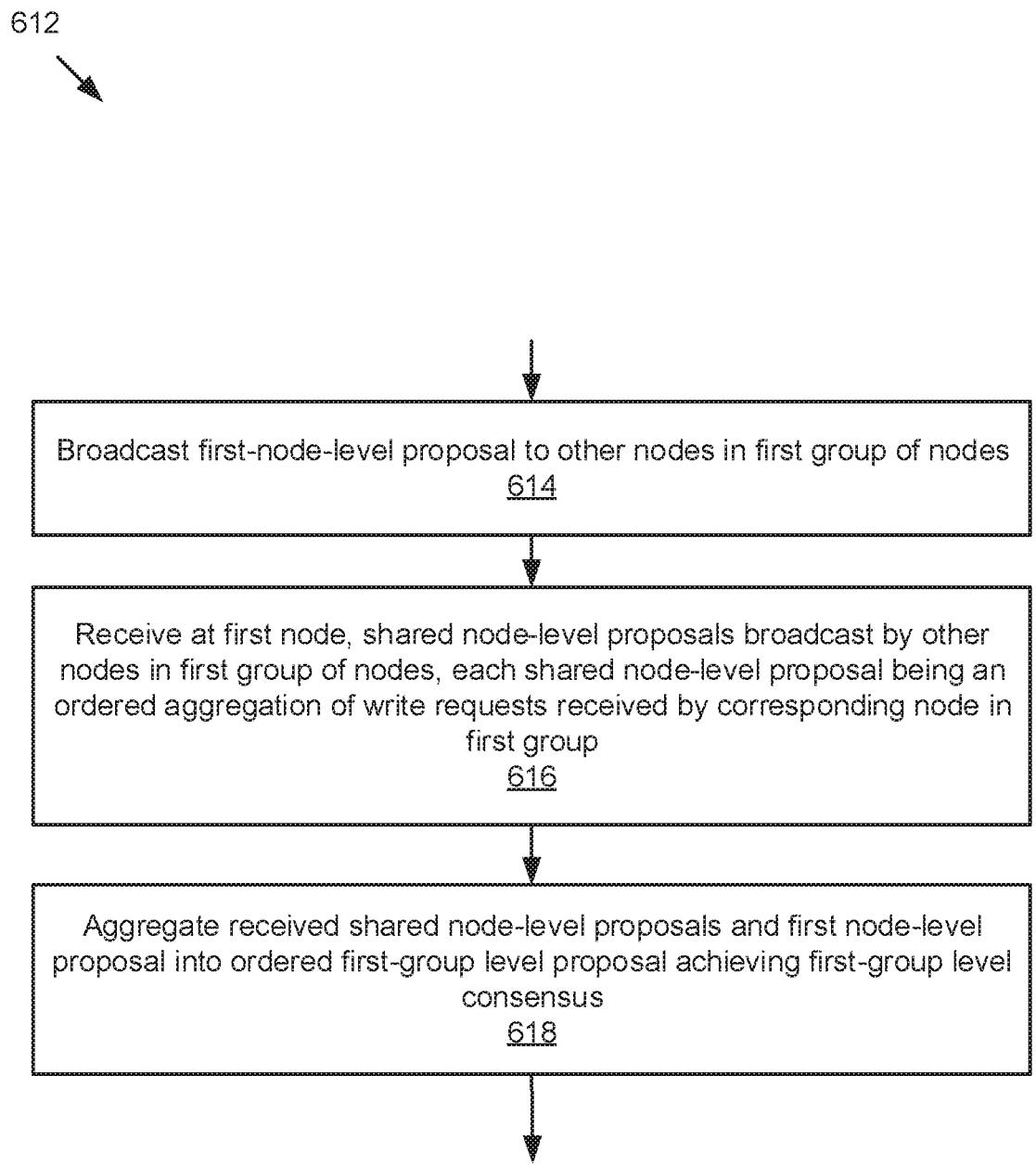

FIG. 6B is a flowchart of an example method 612 for achieving group level consensus. At 614, node 102a broadcasts the first-node-level proposal to other nodes 102 in the first group of nodes 104a. At 616, node 102a receives shared node-level proposals broadcast by other nodes 102 in the first group of nodes 104a. In some implementations, each shared node-level proposal may be an ordered aggregation of write requests received by corresponding nodes, (e.g., other nodes 104) in the first group of nodes 104a. At 618, node 102a may aggregate both the received shared node-level proposals and the first node-level proposal into an ordered first-group level proposal to achieve first-group level consensus.

FIG. 7 is a flowchart of an example method 700 for achieving consensus between a first group of nodes 104a and a second group of nodes 104b. At 702, node 102a may share the first-group level proposal with the second group of nodes 104b of the plurality of nodes. In some implementations, the second group of nodes 104b may be separate from the first group of nodes 104a and each group of nodes may be grouped based on physical proximity of the individual nodes in each group. At 704, node 102a may receive from the second group of nodes 104b an ordered second-group level proposal, the second-group level proposal being an ordered aggregation of node-level proposals from nodes of the second group of nodes 104b. In some implementations, each node-level proposal may be an ordered aggregation of write requests received by corresponding nodes of the second group of nodes and each node-level proposal being assigned a proposal number. In some implementations, a second group level consensus is achieved by ordering the group-level proposal. At 706, node 102a aggregates the ordered first-group level proposal and the ordered second-group level proposal into a first grouping of group level proposals. In some implementations, by aggregating the first grouping of group level proposals, consensus between the first group of nodes and the second group of nodes may be achieved.

Figure 8:
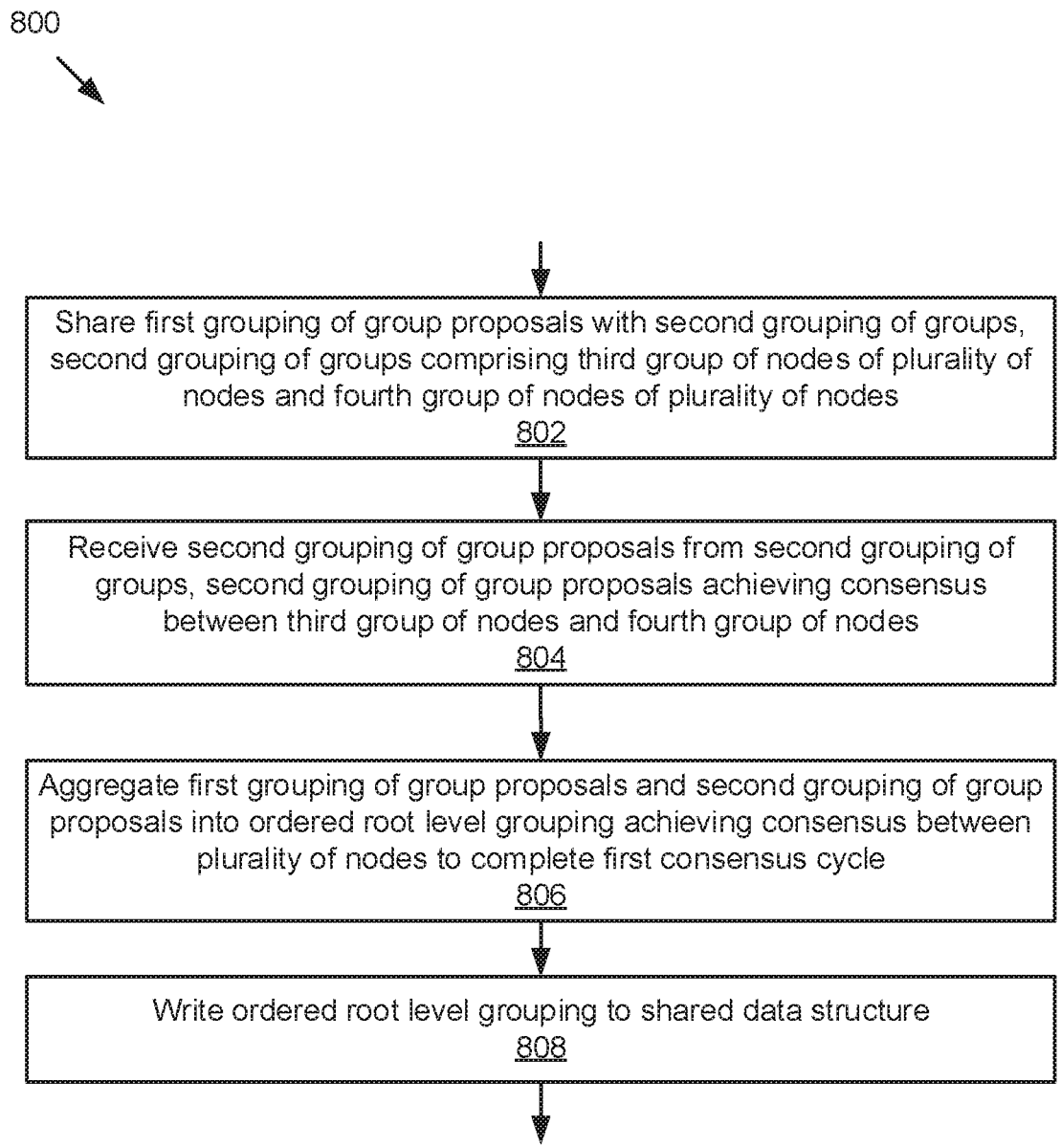
FIG. 8 is a flowchart of an example method for achieving consensus between a root level grouping.

FIG. 8 is a flowchart of an example method 800 for achieving consensus between a root level grouping. At 802, node 102a may share the first grouping of group proposals with a second grouping of groups. In some implementations, the second grouping of groups may comprise a third group of nodes 104c and a fourth group of nodes 104d. At 804, node 102a may receive a second grouping of group proposals from the second grouping of groups. In some implementations, the second grouping of group proposals may achieve consensus between the third group of nodes 104c and the fourth group of nodes 104d. At 806, node 102a aggregates the first grouping of group proposals and the second grouping of group proposals into an ordered root-level grouping, and achieves consensus between the plurality of nodes to complete the first consensus cycle. At 808, node 102a may write the ordered root level grouping to the shared data structure.

In light of the description herein, the described consensus protocol may be applied in the contexts of the types and classes of applications described herein, such as applications that utilize agreement on the entries of replicated transaction log or ledger or other form of agreement between a large number of participants, and applications that use distributed consistent replication. Some examples of such applications with which the described consensus protocol may be advantageously applied are geo-replicated database systems that support high-volume transaction processing, private blockchains, social network linchpin objects across datacenters, airline reservation systems, state machine replication, consistent log replication, and auction systems.

As will be understood by those familiar with the art, the subject matter described herein may be embodied in other specific forms without departing from the spirit or essential characteristics thereof. Likewise, the particular naming and division of the protocols, portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

It is to be understood that although the consensus protocol is at times referred to herein as a single entity, the consensus protocol represents a collection of functionalities, which can be instantiated as multiple (or a single) module(s) as desired. It is to be understood that modules comprising an instantiation of consensus protocol could be in the form of object code or executable images within the system memory (e.g., RAM, ROM, flash memory) of any computer system(s), such that when one or more processors of the computer system(s) processes a module, the computer system(s) execute(s) the associated functionality. As used herein, the terms "computer system," "computer," "client," "client computer," "server," "server computer" and "computing device" mean one or more computers configured and/or programmed to execute the described functionality. Additionally, program code to implement the described functionalities can be stored on computer-readable storage media. Any form of tangible computer readable storage medium can be used in this context, such as magnetic or optical storage media. As used herein, the term "computer readable storage medium" does not mean an electrical signal separate from an underlying physical medium. In addition, some or all of the functionality described herein can be implemented in hardware and/or firmware, instead of and/or in combination with software based instantiations thereof.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting, of the scope of the subject matter set forth in the following claims.

What is claimed is:

1. A computer-implemented method for achieving consensus among a plurality of nodes in a distributed system using a shared data structure, the plurality of nodes being organized into at least a first group of nodes, a second group of nodes, a third group of nodes, and a fourth group of nodes based on physical or geographical proximity, the method comprising the steps of:

receiving at a first node of the first group of nodes, client requests comprising one or more of read requests and write requests, the client requests being associated with portions of a shared data structure identified by unique keys;

storing the client requests in a local buffer of the first node;

initiating a first consensus cycle and labeling the first consensus cycle with a first cycle identifier;

aggregating the client requests stored in the local buffer into a first node-level proposal responsive to the first consensus cycle being initiated;

assigning a proposal number to the first node-level proposal, wherein the proposal number is a random number;

broadcasting the first-node-level proposal to other nodes in the first group of nodes, wherein the other nodes are grouped into the first group of nodes based on physical proximity to the first node;

receiving at the first node, shared node-level proposals broadcast by the other nodes in the first group of nodes, each shared node-level proposal being an ordered aggregation of client requests received by a corresponding node in the first group, each shared node-level proposal being assigned a proposal number;

aggregating the received shared node-level proposals and the first node-level proposal into an ordered first-group level proposal achieving a first-group level consensus;

sharing the first-group level proposal with the second group of nodes of the plurality of nodes, the second group of nodes being separate from the first group of nodes and the second group of nodes being grouped based on physical or geographical proximity to each other;

receiving from the second group of nodes, an ordered second-group level proposal, the second-group level proposal being an ordered aggregation of node-level proposals from nodes of the second group of nodes, each node-level proposal being an ordered aggregation of client requests received by a corresponding node of the second group and assigned a proposal number, the ordered second-group level proposal achieving a second-group level consensus;

aggregating the ordered first-group level proposal and the ordered second-group level proposal into a first grouping of group level proposals, the first grouping of group level proposals achieving consensus between the first group of nodes and the second group of nodes;

sharing the first grouping of group proposals with a second grouping of groups, the second grouping of groups comprising the third group of nodes of the plurality of nodes and the fourth group of nodes of the plurality of nodes;

receiving a second grouping of group proposals from the second grouping of groups, the second grouping of group proposals achieving consensus between the third group of nodes and the fourth group of nodes;

aggregating the first grouping of group proposals and the second grouping of group proposals into an ordered root level grouping achieving consensus between the plurality of nodes to complete the first consensus cycle; and writing the ordered root level grouping to the shared data structure.

2. The computer-implemented method of claim 1, further comprising:

initiating a second consensus cycle responsive to occurrence of a specific event.

3. The computer-implemented method of claim 2 wherein the specific event further comprises:

receiving at the first node from another node of the plurality of nodes, a subsequent message with a higher cycle identifier than the first cycle identifier.

4. The computer-implemented method of claim 2 wherein the specific event further comprises:

receiving an additional request at the first node from the client, after the first consensus cycle has been initiated;

initiating an expiration of a time period responsive to receiving the additional request.

5. The computer-implemented method of claim 4 further comprising:

receiving a plurality of subsequent requests from the client;

aggregating subsequent requests received after the additional request but before the expiration of the time period into a second consensus cycle node-level proposal.

6. The computer-implemented method of claim 1 further comprising:

prior to the first node sharing the first-group level proposal with the second group of nodes of the plurality of nodes, electing the first node as a representative of the first group of nodes using a local consensus protocol; and designating the elected representative of the first group of nodes to obtain the first-group level proposal from the second group of nodes of the plurality of nodes.

7. The computer implemented method of claim 2 further comprising:

initiating the second consensus cycle prior to the first consensus cycle being completed.

8. The computer-implemented method of claim 1 further comprising:

aggregating, the client requests into a first node-level proposal by the first node, in parallel with each shared node-level proposal being aggregated by the corresponding node in the first group of nodes.

9. The computer-implemented method of claim 1 further comprising:

responsive to receiving at the first node a first write request associated with a first portion of the shared data structure and identified by a first unique key, requesting a write lease for a future consensus cycle by the first node;

including the write lease in the first node-level proposal, the write lease indicating to the plurality of nodes that any node of the plurality of nodes is allowed to execute write requests in the future consensus cycle to the first portion of the shared data structure identified by the first unique key.

10. The computer-implemented method of claim 1, further comprising:

determining at the first node, whether a write lease has been asserted for a specific portion of the shared data structure;

responsive to determining that the write lease has not been asserted, executing one or more read requests associated with the specific portion of the shared data structure without waiting for an end of the first consensus cycle;

refraining from executing write requests associated with the specific portion of the shared data structure during the first consensus cycle; and responsive to determining that the write lease has been asserted, executing one or more write requests associated with the specific portion of the shared data structure based on the ordered root-level grouping and executing the one or more read requests associated with the specific portion of the shared data structure at the end of the first consensus cycle.

11. The computer-implemented method of claim 1, wherein the proposal number of the first node-level proposal and one of the proposal numbers of one of the shared node-level proposals associated with one of the other nodes in the first group of nodes are identical, the computer-implemented method further comprising:

ordering the first node-level proposal and the shared node-level proposal using a first node identifier value associated with the first node and a second node identifier value associated with the one of the other nodes in the first group of nodes.

12. The computer-implemented method of claim 1, wherein:

physical proximity further comprises one of a same rack, a same data center, and a same switch.

13. The computer-implemented method of claim 1, wherein:

geographical proximity further comprises one of a same city, a same region, a same state, a same province, a same country, and a same continent.

14. The computer-implemented method of claim 1, wherein:

sharing the first-group level proposal with the second group of nodes of the plurality of nodes further comprises sharing the first-group level proposal with a pre-selected node from the second group of nodes, the pre-selected node being identified to receive the first-group level proposal based on an emulation table accessible by the first node.

15. The computer-implemented method of claim 13, further comprising:

instantiating the emulation table to indicate that the first node is a first emulator and the pre-selected node from the second group of nodes is a second emulator; and updating the emulation table responsive to a failure of one of the first emulator and the second emulator.

16. The computer-implemented method of claim 1, further comprising:

ordering the ordered root level grouping using proposal numbers for each of the node level proposals included in the first grouping of group proposals and the second grouping of group proposals.

17. The computer-implemented method of claim 1, wherein aggregating client requests further comprises:

aggregating write requests of the client requests stored in the local buffer into a first node-level proposal responsive to the first consensus cycle being initiated ordering the ordered root level grouping using proposal numbers for each of the node level proposals included in the first grouping of group proposals and the second grouping of group proposals.

18. The computer-implemented method of claim 1, wherein each node-level proposal further comprises:

an ordered aggregation of write requests received by a corresponding node.

* * * * *